(12) United States Patent
Kubo

(10) Patent No.: US 6,857,031 B2
(45) Date of Patent: Feb. 15, 2005

(54) DMA TRANSFER METHOD

(75) Inventor: Yasuhiro Kubo, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/382,391

(22) Filed: Mar. 6, 2003

(65) Prior Publication Data

US 2003/0145139 A1 Jul. 31, 2003

Related U.S. Application Data

(62) Division of application No. 09/586,042, filed on Jun. 2, 2000, now Pat. No. 6,557,052.

(30) Foreign Application Priority Data

Jun. 7, 1999 (JP) .......................................... 11-160077

(51) Int. Cl.[7] ................................................ G06F 3/00
(52) U.S. Cl. ............................ 710/53; 710/56; 710/62; 710/74
(58) Field of Search ............................ 710/52, 53, 54, 710/55, 56, 57, 62, 74, 1, 20, 21, 22–23, 25–28, 31, 33, 36, 123, 35; 711/100, 112, 169, 138, 140; 712/225

(56) References Cited

U.S. PATENT DOCUMENTS

| | | | | |
|---|---|---|---|---|
| 4,926,324 A | * | 5/1990 | Yamamoto et al. ........... 710/20 |
| 5,261,057 A | | 11/1993 | Coyle et al. ................ 395/275 |
| 5,608,889 A | | 3/1997 | Werlinger et al. .......... 711/217 |
| 5,642,492 A | * | 6/1997 | Iizuka ......................... 711/100 |
| 5,664,223 A | | 9/1997 | Bender et al. ................ 710/22 |
| 5,847,771 A | | 12/1998 | Cloutier et al. ............. 348/564 |
| 5,890,012 A | | 3/1999 | Poisner ........................ 710/22 |
| 6,012,109 A | | 1/2000 | Schultz ........................ 710/56 |
| 6,044,440 A | * | 3/2000 | Haghighi .................... 711/140 |
| 6,128,703 A | * | 10/2000 | Bourekas et al. ........... 711/138 |
| 6,557,052 B1 | * | 4/2003 | Kubo .......................... 710/23 |

* cited by examiner

*Primary Examiner*—Fritz Fleming
*Assistant Examiner*—Alan S Chen
(74) *Attorney, Agent, or Firm*—RatnerPrestia

(57) ABSTRACT

A DMA transfer device has stream inputting means for receiving an encoded first stream;

first stream storing means for storing the first stream;

a main storage unit which stores the stream of said first stream storing means;

first DMA transfer executing means for executing a first DMA transfer from said first stream storing means to said main storage unit;

first DMA transfer controlling means for controlling said first DMA transfer executing means on the basis of an amount of data which are stored in said first stream storing means or a free capacity;

a processing unit which produces a second stream from the first stream that is read out from said main storage unit, and which writes the second stream into said main storage unit;

second stream storing means for storing the second stream of said main storage unit;

second DMA transfer executing means for executing a second DMA transfer from said main storage unit to said second stream storing means; and second DMA transfer controlling means for controlling said second DMA transfer executing means on the basis of an amount of data which are stored in said second stream storing means or a free capacity.

4 Claims, 7 Drawing Sheets

DMA TRANSFER METHOD

This application is a divisional of U.S. patent application Ser. No. 09/586,042, filed Jun. 2, 2000 now U.S. Pat. No. 6,557,052.

BACKGROUND OF THE INVENTION

1. Field of the Invention

The present invention relates to a DMA transfer device in which a single bus master device executes two kinds of DMA transfers.

2. Description of the Prior Art

In accordance with recent improvement of the throughput of a personal computer, a demand for performing by means of software a process which is conventionally performed by means of hardware is increasing. For example, there is a case where an encoded stream is fetched into a personal computer and then processed by means of software, and a stream produced as a result of the process is supplied to a device such as a video decoder to be output as an image or sound. FIG. 7 shows a configuration example of the prior art. An encoded first stream which is input through stream inputting means 701 is stored into first stream storing means 702. In response to a transfer request from a processing unit 704, first DMA transfer executing means 703 then executes a DMA transfer of the first stream stored in the first stream storing means 702 to a main storage unit 705. The processing unit 704 reads out the first stream from the main storage unit 705, performs software decoding on the first stream to produce a second stream, and stores the second stream into the main storage unit 705. In response to a transfer request from the processing unit 704, thereafter, second DMA transfer executing means 707 executes a DMA transfer of the second stream stored in the main storage unit 705 to second stream storing means 706.

In the prior art, a bus master device (corresponding to the first DMA transfer executing means 703 and the second DMA transfer executing means 707) which is employed in a DMA transfer is used in both the transfer from the first stream storing means 702 to the main storage unit 705, and that from the main storage unit 705 to the second stream storing means 706.

In the case where the amount of data requested in the first DMA transfer is larger than that of data accumulated in the first stream storing means 702, the bus master device cannot start the first DMA transfer until data of an amount which is equal to the requested data amount in the DMA transfer are accumulated in the first stream storing means 702. Similarly, in the case where the amount of data requested in the second DMA transfer is larger than the free capacity of the second stream storing means 706, the bus master device cannot start the second DMA transfer until a free capacity which is equal to the requested data amount in the DMA transfer is ensured in the second stream storing means 706.

As a result, in the case where, when the processing unit 704 requests the first DMA transfer after the processing unit requests the second DMA transfer, the free capacity is not sufficient for starting the transfer to the second stream storing means 706, for example, the bus master device must wait to perform the first DMA transfer until the second DMA transfer is ended. In the first stream storing means 702, therefore, an overflow occurs in the first stream from the stream inputting means.

Similarly, in the case where, when the processing unit 704 requests the second DMA transfer after the processing unit requests the first DMA transfer, the data amount is not sufficient for starting the transfer to the first stream storing means 702, the bus master device must wait to perform the second DMA transfer until the first DMA transfer is ended. Therefore, an underflow occurs in the second stream storing means 706.

SUMMARY OF THE INVENTION

In view of the problems of a DMA transfer method of the prior art, it is an object of the invention to provide a DMA transfer device in which an overflow or an underflow in such first and second stream storing means hardly ever occurs.

One aspect of the present invention is a DMA transfer device comprising:

The $1^{st}$ invention of the present invention (corresponding to claim 1) is a DMA transfer device comprising:

stream inputting means for receiving an encoded first stream;

first stream storing means for storing the first stream;

a main storage unit which stores the stream of said first stream storing means;

first DMA transfer executing means for executing a first DMA transfer from said first stream storing means to said main storage unit;

first DMA transfer controlling means for controlling said first DMA transfer executing means on the basis of an amount of data which are stored in said first stream storing means or a free capacity;

a processing unit which produces a second stream from the first stream that is reads out from said main storage unit, and which writes the second stream into said main storage unit;

second stream storing means for storing the second stream of said main storage unit;

second DMA transfer executing means for executing a second DMA transfer from said main storage unit to said second stream storing means; and second DMA transfer controlling means for controlling said second DMA transfer executing means on the basis of an amount of data which are stored in said second stream storing means or a free capacity.

Another aspect of the present invention is a DMA transfer device wherein, when the data amount D1 of said first stream storing means is equal to or larger than a data amount D1req which is requested by said processing unit, said first DMA transfer controlling means Issues a first DMA transfer start command to said first DMA transfer executing means, and said first DMA transfer executing means executes the first DMA transfer from said first stream storing means to said main storage unit.

Still another aspect of the present invention is a DMA transfer device, wherein, when the free capacity E2 of said second stream storing means is equal to or larger than a data amount D2req which is requested by said processing unit, said second DMA transfer controlling means issues a second DMA transfer start command to said second DMA transfer executing means, and said second DMA transfer executing means executes a DMA transfer of the second stream stored in the main storage unit to said second stream storing means.

Yet another aspect of the present invention is a DMA transfer device wherein said DMA transfer device further comprises DMA transfer priority judging means for judging priorities of the first DMA transfer and the second DMA transfer, and in accordance with a result of the judgement, said DMA transfer priority judging means controls said first DMA transfer controlling means and said second DMA transfer controlling means.

Still yet another aspect of the present invention is a DMA transfer device wherein the encoded stream conforms to the MPEG standard, said first and second stream storing means are FIFOs, and said first and second DMA transfer executing means are configured by a bus master device.

A further aspect of the present invention is a DMA transfer device wherein said FIFOs receive a TS input or a PS input.

A still further aspect of the present invention is a medium carrying a program and/or a data for causing a computer to execute a whole or a part of functions of a whole or a part of the invention, said medium being processable by a computer.

A yet further aspect of the present invention is an information aggregation which is a program and/or a data for causing a computer to execute a whole or a part of functions of a whole or a part of the means of the invention.

DESCRIPTION OF THE REFERENCE NUMERALS AND SIGNS

Figure 1:
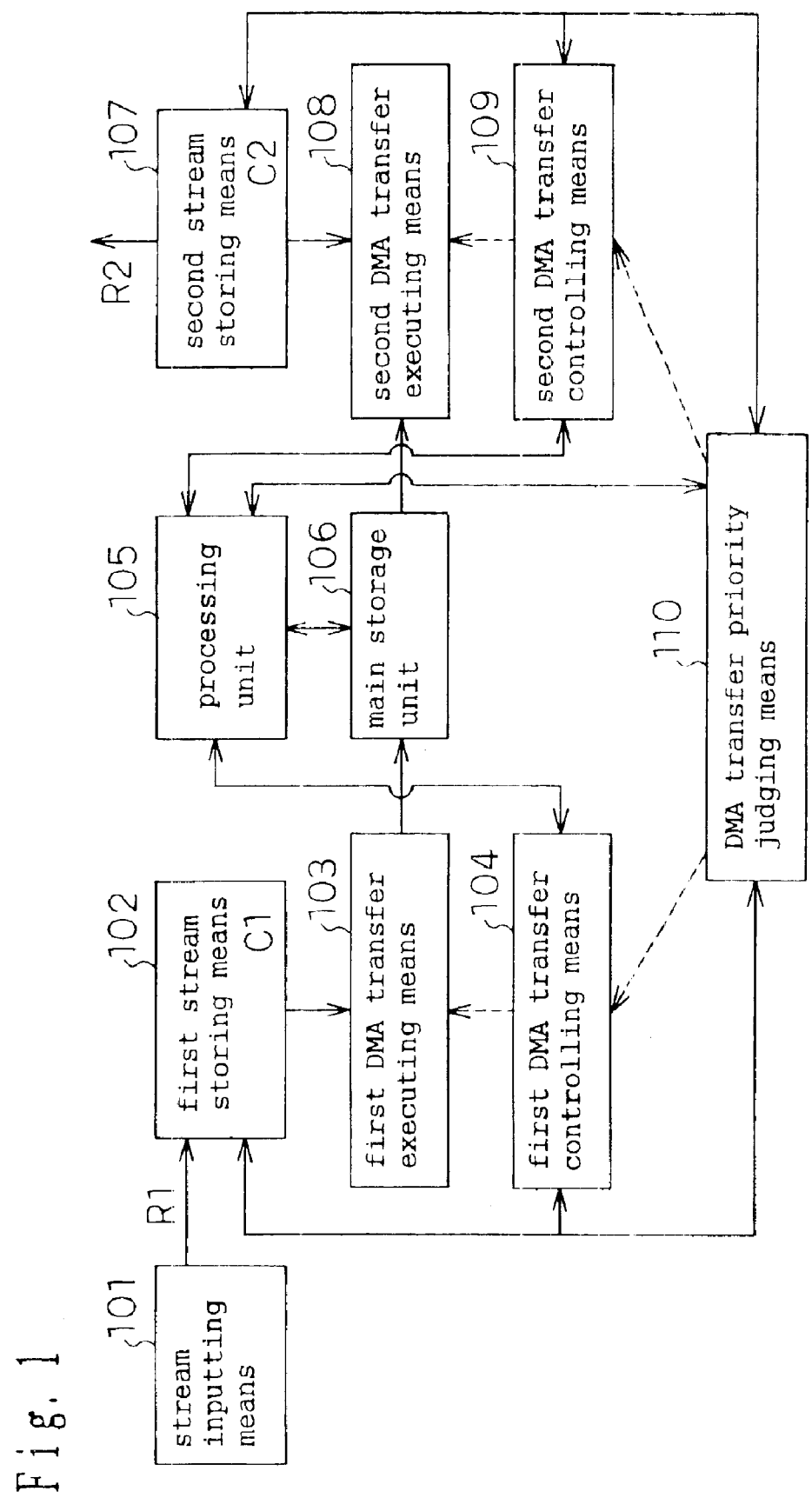
FIG. 1 is a block diagram of a DMA transfer device of a first embodiment of the invention.

101, 701 stream inputting means
102, 702 first stream storing means
103, 703 first DMA transfer executing means
104 first DMA transfer controlling means
105, 704 processing unit
106, 705 main storage unit
107, 706 second stream storing means
108, 707 second DMA transfer executing means
109 second DMA transfer controlling means
110 DMA transfer priority judging means
301 tuner
302 VSB demodulator
303 TS input FIFO
303, 407 bus master device
305 PES output FIFO
306 video decoder
307 CPU
308 main memory
401 TS read thread
402 decode thread
403 PES write thread
404 TS input buffer
405 PES output buffer
406 device driver

DESCRIPTION OF THE PREFERRED EMBODIMENTS

Hereinafter, an embodiment of the invention will be described with reference to the accompanying drawings.

First Embodiment

FIG. 1 is a block diagram of a first embodiment of the invention. A DMA transfer device of the first embodiment of the invention is configured by stream inputting means 101, first stream storing means 102, first DMA transfer executing means 103, first DMA transfer controlling means 104, a processing unit 105, a main storage unit 106, second stream storing means 107, second DMA transfer executing means 108, second DMA transfer controlling means 109, and DMA transfer priority judging means 110.

An encoded first stream which is input though the stream inputting means 101 is stored into the first stream storing means 102.

(1-1) When the data amount D1 of the first stream storing means 102 is equal to or larger than a data amount D1req ($\leq$ a first stream storage capacity C1) which is requested by the processing unit 105, the first DMA transfer controlling means 104 issues a first DMA transfer start command to the first DMA transfer executing means 103, and the first DMA transfer executing means 103 executes a first DMA transfer from the first stream storing means 102 to the main storage unit 106.

(1-2) When the data amount D1 of the first stream storing means 102 is smaller than the data amount D1req requested by the processing unit 105, the first DMA transfer controlling means 104 performs a waiting operation for a time which is calculated by (D1req−D1)/R1 where R1 is the transfer rate in writing of the first stream into the first stream storing means 102, and then issues a first DMA transfer start command to the first DMA transfer executing means 103. The first DMA transfer executing means 103 executes the first DMA transfer from the first stream storing means 102 to the main storage unit 106.

The processing unit 105 reads out a first stream (for example, a transport stream (hereinafter, abbreviated to TS) or a program stream (hereinafter, abbreviated to PS)) from the main storage unit 106, performs software decoding to produce a second stream (for example, a packetized elementary stream (hereinafter, abbreviated to PES) or an elementary stream (hereinafter, abbreviated to ES)), and stores the second stream into the main storage unit 106.

(2-1) When the free capacity E2 of the second stream storing means 107 is equal to or larger than a data amount D2req ($\leq$ a second stream storage capacity C2) which is requested by the processing unit 105, the second DMA transfer controlling means 109 issues a second DMA transfer start command to the second DMA transfer executing means 108, and the second DMA transfer executing means 108 executes a DMA transfer of the second stream stored in the main storage unit 106 to the second stream storing means 107.

(2-2) When the free capacity E2 of the second stream storing means 107 is smaller than the data amount D2req requested by the processing unit 105, the second DMA transfer controlling means 109 performs a waiting operation for a time which is calculated by (D2req−E2)/R2 where R2 is the transfer rate in reading of the second stream from the second stream storing means 107, and then issues a second DMA transfer start command to the second DMA transfer executing means 108. The second DMA transfer executing means 108 transfers the second stream stored in the main storage unit 106 to the second stream storing means 107.

Figure 2:
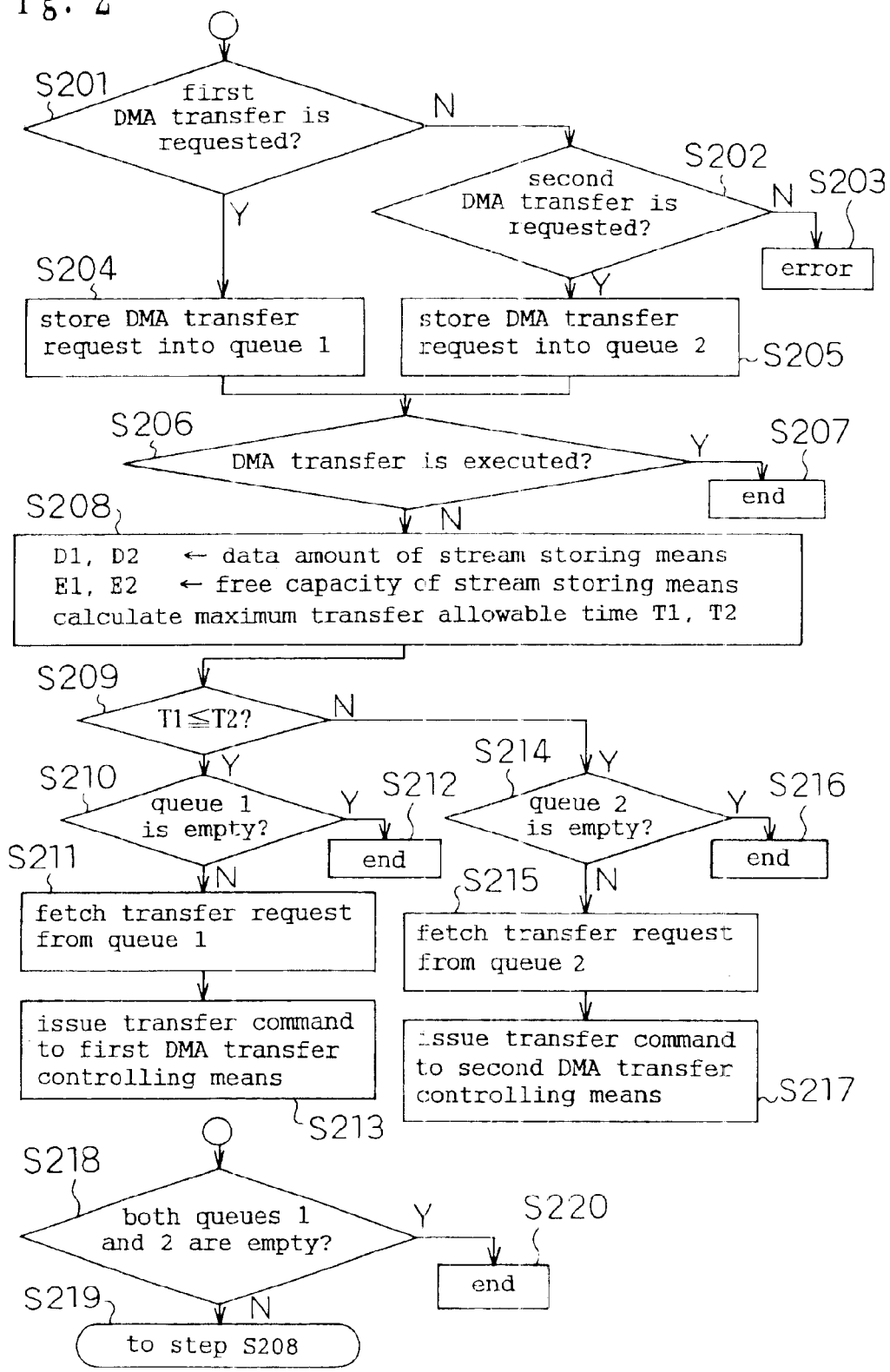
FIG. 2 is a control flowchart of DMA transfer priority judging means of the DMA transfer device of the first embodiment of the invention.

The DMA transfer priority judging means 110 receives requests for the first and second DMA transfers from the processing unit 105, judges the priorities of the first and second DMA transfers on the basis of a control flowchart shown in FIG. 2, and controls the first DMA transfer controlling means 104 and the second DMA transfer controlling means 109.

Hereinafter, the operation of the DMA transfer priority judging means 110 will be described in detail with reference to FIG. 2. It is judged whether a DMA transfer request from the processing unit 105 is a request for the first DMA transfer or not (step S201). If the request is the first DMA transfer request, the DMA transfer request is stored into a queue 1 (step S204). If the request is not the first DMA transfer request, the DMA transfer request is further judged whether it is a request for the second DMA transfer or not (step S202). If the request is the second DMA transfer request, the DMA transfer request is stored into a queue 2 (step S205). If the request is not the second DMA transfer request, it is judged that there is no corresponding transfer request and an error occurs (step S203).

After the transfer request is stored into the queue 1 or 2 (step S204 or S205), it is judged whether the DMA transfer is being executed or not (step S206). If the DMA transfer is being executed, the control is ended (step S207). If the DMA transfer is not being executed, the data amount D1 or the free capacity E1 of the first stream storing means 102, and the data amount D2 or the free capacity E2 of the second stream-storing means 107 are obtained, and first and second maximum transfer allowable times T1 and T2 ($\geq 0$) are calculated (step S208)

The first and second stream storage capacities are respectively indicated by C1 and C2, the transfer rate in writing into the first stream storing means 102 is indicated by R1, and the transfer rate in reading from the second stream storing means 107 is indicated by R2.

The first maximum transfer allowable time T1 is calculated by:

$$T1=(C1-D1)/R1=E1/R1 \quad [\text{Ex. 1}]$$

and equal to a time which is required for filling the first stream storing means.

The second maximum transfer allowable time T2 is calculated by:

$$T2=(C2-E2)/R2=D2/R2 \quad [\text{Ex. 2}]$$

and equal to a time which is required for emptying the second stream storing means.

From a result of the calculation in step S208, the lengths of T1 and T2 are compared with each other (step S209). If T1 is equal to or shorter than T2, it is judged whether the queue 1 is empty or not (step S210). If the queue 1 is empty, there is no transfer request, and hence the control is ended (step S212) If the queue 1 is not empty, one transfer request is fetched from the queue 1 (step S211), and a transfer command is issued to the first DMA transfer controlling means 104 (step S213).

If T1 is longer than T2, it is judged whether the queue 2 is empty or not (step S214). If the queue 2 is empty, there is no transfer request, and hence the control is ended (step S216) If the queue 2 is not empty, one transfer request is fetched from the queue 2 (step S215), and a transfer command is issued to the second DMA transfer controlling means 109 (step S217).

After the DMA transfer is ended, it is judged whether both the queues 1 and 2 are empty or not (step S218). If both the queues are empty, there is no transfer request to be processed, and hence the control is ended (step S220). If either of the queues is not empty, there is a transfer request to be processed, and hence the control jumps to step S208 (step S219).

As described above, the first and second maximum transfer allowable times T1 and T2 indicate the times which are required for the first and second stream storing means 102 and 107 to cause an overflow or an underflow, respectively. The priorities of the first and second transfers are judged by comparing the lengths of T1 and T2, whereby a stable DMA transfer can be realized.

In the above process, it is assumed that, during initialization, the transfer rates R1 and R2 are notified from the processing unit 105 to the first DMA transfer controlling means 104, the second DMA transfer controlling means 109, and the DMA transfer priority judging means 110.

Second Embodiment

Figure 3:
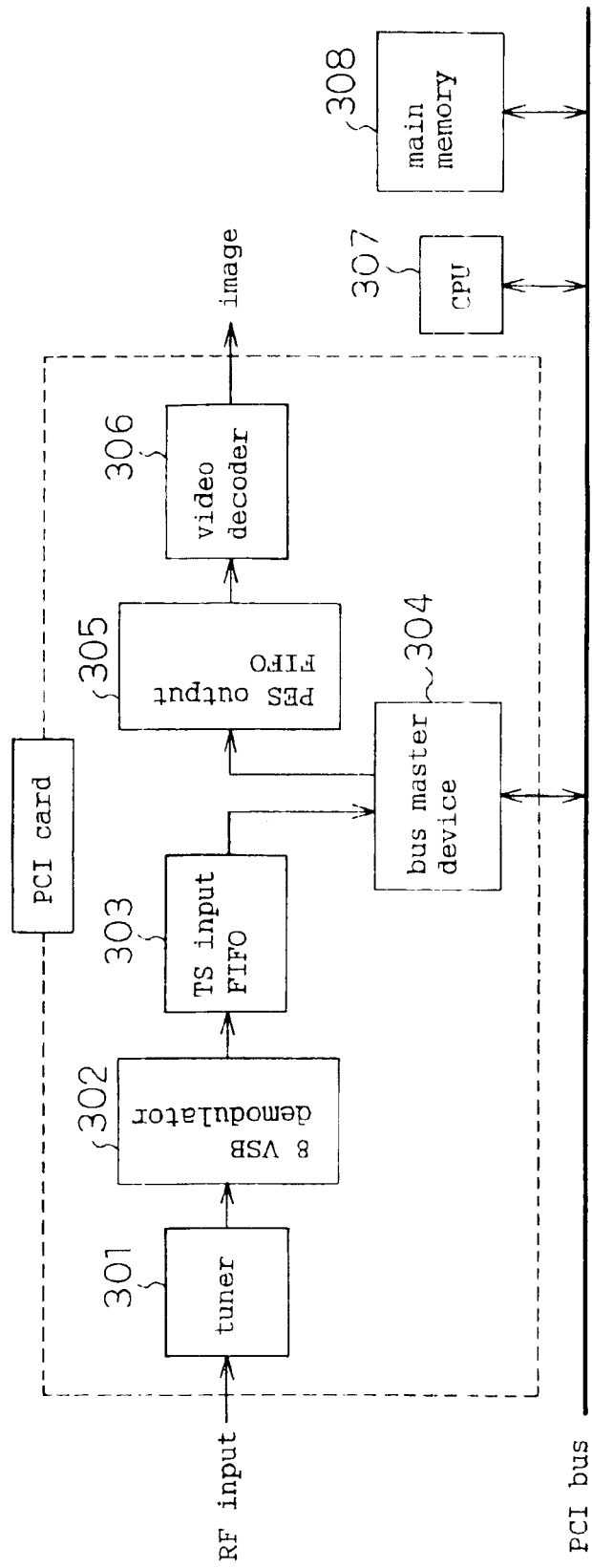
FIG. 3 is a block diagram of a DMA transfer device of a second embodiment of the invention.

FIG. 3 is a block diagram of a DMA transfer device which is a second embodiment of the invention. The DMA transfer device of the second embodiment of the invention is a card for receiving a North American terrestrial digital TV broadcasting, and configured by a tuner 301, an 8 VSB demodulator 302, a TS input FIFO 303 (256 KB), a bus master device 304, a PES output FIFO 305 (256 KB), a video decoder 306, a CPU 307, and a main memory 308.

The tuner 301 and the 8 VSB demodulator 302 correspond to the stream inputting means in the invention, the TS input FIFO 303 corresponds to the first stream storing means in the invention, the bus master device 304 corresponds to the first and second DMA transfer executing means in the invention, the PES output FIFO 305 corresponds to the second stream storing means in the invention, the CPU 307 corresponds to the processing unit, the first DMA transfer controlling means, the first DMA transfer executing means, the second DMA transfer controlling means, the second DMA transfer executing means, and the DMA transfer priority judging means in the invention, and the main memory 308 corresponds to the main storage unit in the invention.

A bit stream which is input by an RF is subjected to synchronization in the tuner 301, tuned by a predetermined reception frequency, and then demodulated into a TS in the 8 VSB demodulator 302. Thereafter, the demodulated TS is stored into the TS input FIFO 303. In response to a TS DMA transfer start command from the CPU 307, the bus master device 304 executes a DMA transfer from the TS input FIFO to the main memory 308 via a PCI bus. After the DMA is completed, the CPU 307 decodes the TS in the main memory 308, and produces a PES in the main memory 308. Thereafter, in response to a PES DMA transfer command from the CPU 307, the bus master device 304 executes a DMA transfer from the main memory 308 to the PES output FIFO 305 via the PCI bus. The PES stored in the PES output FIFO 305 is consumed by the video decoder and then output as an image.

Figure 4:
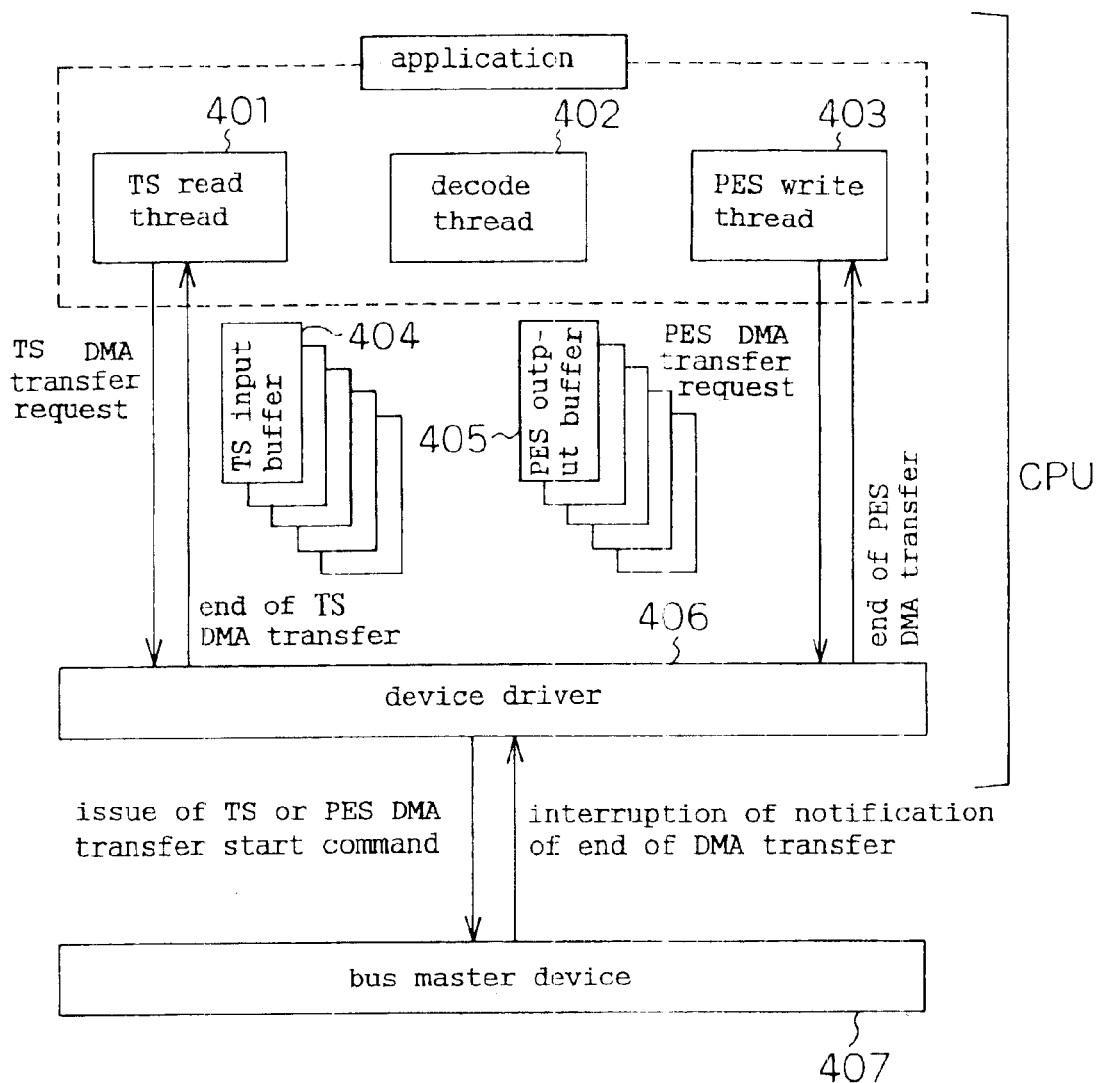
FIG. 4 is a diagram showing the concepts of operations of an application and a device driver which are executed in a CPU 307 of FIG. 3.

FIG. 4 is a diagram showing the concepts of operations of an application and a device driver (corresponding to the DMA transfer priority judging means and the first and second DMA transfer controlling means in the invention) which are executed in the CPU 307 when the CPU 307 issues the TS or PES DMA transfer start command to the bus master device 304, and the bus master device 304.

The application is configured by three threads of: a TS read thread 401 for reading a TS into TS input buffers 404 (64 KB×5) reserved in the main memory 308; a decode thread 402 for analyzing the TS read out from the TS input buffers 404, and for producing a PES in PES output buffers 405 (64 KB×5) reserved in the main memory 308; and a PES write thread 403 for writing the PES from the PES output buffers 405. The threads independently operate. Each of the TS input buffers 404 is exclusively accessed by the TS read thread 401 and the decode thread 402, and each of the PES output buffers 405 is exclusively accessed by the decode thread 402 and the PES write thread 403.

The TS read thread 401 requests a TS DMA transfer to a device driver 406 when a TS is to be read into the TS input buffers 404. The PES write thread 403 requests a PES DMA transfer to the device driver 406 when a PES is to be written from the PES output buffers 405.

In the case where the DMA transfer start command to be issued is directed to a TS, the device driver 406 obtains the physical address and the size that are scatter-gathered, from the initial address of the TS input buffer 404 to which the transfer is requested, notifies them to a bus master device 407, and then issues a TS DMA transfer start command. In the case where the DMA transfer start command to be issued is directed to a PES, the physical address and the size that are scatter-gathered are obtained from the initial address of the PES output buffers 405 to which the transfer is requested, the bus master device 407 is notified of them, and a PES DMA transfer start command is then issued.

The bus master device 407 (corresponding to the bus master device 304 of FIG. 3) receives the DMA transfer start command, and then executes a TS DMA transfer or a PES DMA transfer. When the DMA transfer is ended, the bus master device issues an interrupt and notifies the end to the device driver 406.

In response to the interrupt, in the case where the DMA transfer of the requested amount has not yet been ended, the device driver 406 executes the DMA transfer of the remaining amount, and, in the case where the DMA transfer of the requested amount has been ended, the device driver notifies the end to the TS read thread 401 or the PES write thread 403.

Figure 5:
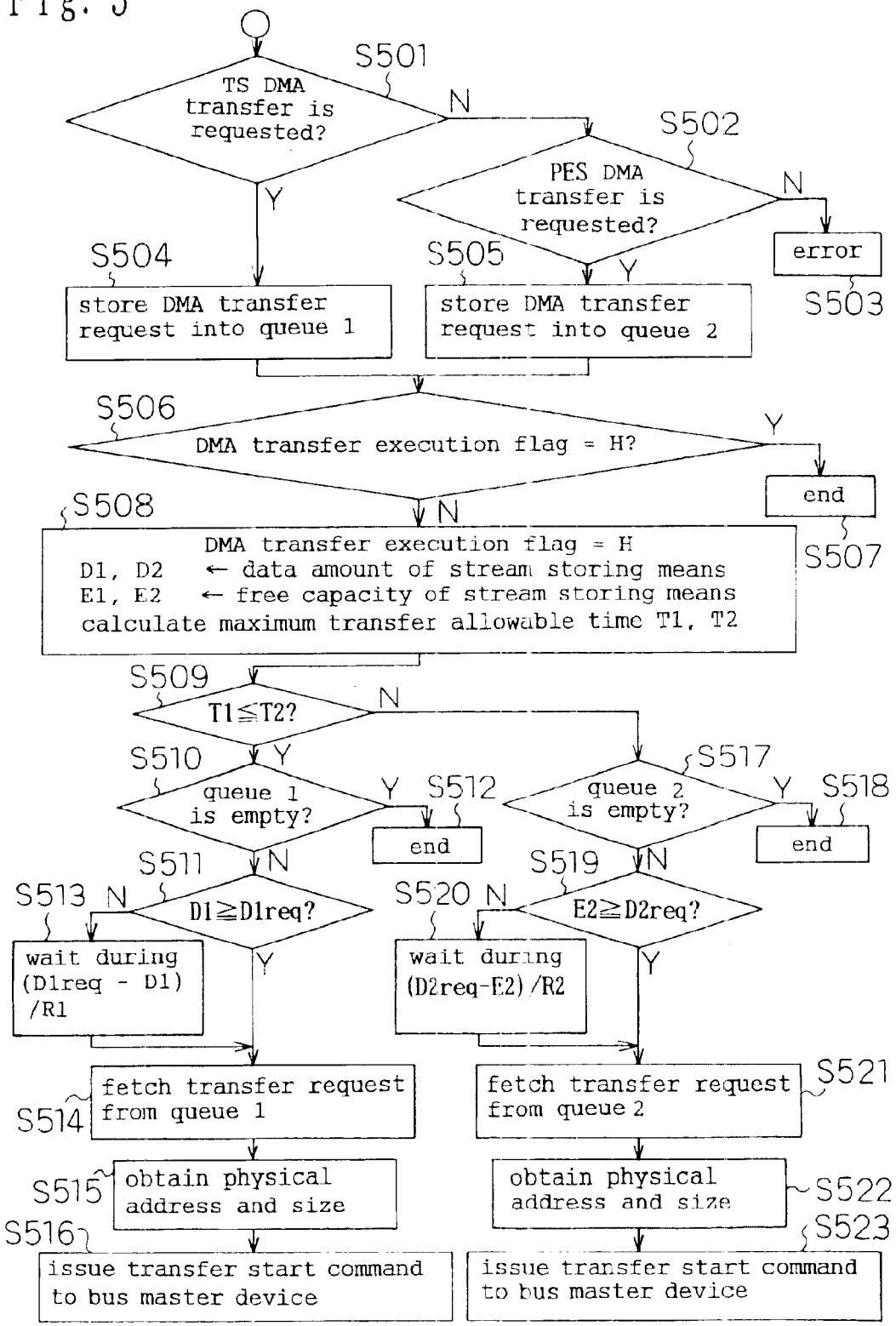
FIG. 5 is an operation flowchart of a device driver 406 in the case where the driver receives a DMA transfer request from an application of FIG. 3.

FIG. 5 shows in detail the operation flow of the device driver 406 in the case where the driver receives a DMA transfer request from the application. It is judged whether the DMA transfer request from the application is a TS DMA transfer request or not (step S501). If the request is a TS DMA transfer request, the DMA transfer request is stored into a queue 1 (step S504). In thus case, a DMA transfer request indicates a data structure which is called an I/O request packet (hereinafter, abbreviated to IRP) in the case where the OS is Windows NT 4.0, or a data structure which is called a stream request block (hereinafter, abbreviated to SRB) in the case where the OS (for example, Windows 98 or Windows 2000) conforms to Windows Driver Model (hereinafter, abbreviated to WDM).

If a result of the judgement in step S501 shows that the request is not a TS DMA transfer request, it is judged whether the request is a PES DMA transfer request or not (step S502). If the request is a PES DMA transfer request, the DMA transfer request is stored into a queue 2 (step S505). If the request is not a PES DMA transfer request, it is judged that there is no corresponding transfer request and an error occurs (step S503).

After the transfer request is stored into the queue 1 or 2 (step S504 or S505), it is judged whether a DMA transfer execution flag which has been set to L in the initialization of the device driver 406 is H or not (step S506). If the DMA transfer execution flag is H, the control is ended (step S507). If not H, the DMA transfer execution flag is set to H, the data amount D1 or the free capacity E1 of the TS input FIFO 303, and the data amount D2 or the free capacity E2 of the PES output FIFO 305 are obtained, and maximum transfer allowable times T1 and T2 ($\geq 0$) of the TS and the PES are calculated (step S508).

The capacities of the TS input FIFO 303 and the PES output FIFO 305 are respectively indicated by C1 and C2, the transfer rate in writing,into the TS input FIFO 303 is indicated by R1, and the transfer rate in reading from the PES output FIFO 305 is indicated by R2.

The maximum transfer allowable time T1 for a TS is calculated by:

$$T1=(C1-D1)/R1=E1/R1 \quad [\text{Ex. 3}]$$

and equal to a time which is required for filling the TS input FIFO 303.

The maximum transfer allowable time T2 for a PES is calculated by:

$$T2=(C2-E2)/R2=D2/R2 \quad [\text{Ex. 4}]$$

and equal to a time which is required for emptying the PES output FIFO 305.

It is assumed that, during initialization of the application, the transfer rates R1 and R2 are notified to the device driver 406.

From a result of the calculation in step S508, the lengths of T1 and T2 are compared with each other (step S509). If T1 is equal to or shorter than T2, it is judged whether the queue 1 is empty or not (step S510). If the queue 1 is empty, there is no transfer request, and hence the control is ended (step S512). If the queue 1 is not empty, the data amount D1 of the TS input FIFO 303, and a transfer requested amount D1req ($\leq C1$) of the TS read thread 401 are compared with each other (step S511).

If D1 is equal to or larger than D1req, one transfer request is immediately fetched from the queue 1 (step S514), and the scatter-gathered physical address and size of the corresponding TS input buffer 404 are obtained from the fetched IRP or SRB data structure and then notified to the bus master device 407 (step S515). Thereafter, a TS DMA transfer start command is issued to the bus master device 407 (step S516).

If D1 is smaller than D1req, the control is waited for a time which is calculated by (D1req−D1)/R1 (step S513). Thereafter, one transfer request is fetched from the queue 1 (step S514), and the scatter-gathered physical address and size of the corresponding TS input buffer 404 are obtained from the fetched IRP or SRB data structure and then notified to the bus master device 407 (step S515). Thereafter, the TS DMA transfer start command is issued to the bus master device 407 (step S516).

If T1 is longer than T2, it is judged whether the queue 2 is empty or not (step S517). If the queue 2 is empty, there is no transfer request, and hence the control is ended (step S518) If the queue 2 is not empty, the free capacity E2 of the PES output FIFO 305, and a transfer requested amount D2req ($\leq C2$) of the PES write thread 402 are compared with each other (step S519).

If E2 is equal to or larger than D2req, one transfer request is immediately fetched from the queue 2 (step S521), and the scatter-gathered physical address and size of the corresponding PES output buffer 405 are obtained from the fetched IRP or SRB data structure and then notified to the bus master device 407 (step S522). Thereafter, a PES DMA transfer start command is issued to the bus master device 407 (step S523).

If E2 is smaller than D2req, the control is waited for a time which is calculated by (D2req−E2)/R2 (step S520). Thereafter, one transfer request is fetched from the queue 2 (step S521), and the scatter-gathered physical address and size of the corresponding PES output buffer 405 are obtained from the fetched IRP or SRB data structure and then notified to the bus master device 407 (step S522). Thereafter, the PES DMA transfer start command is issued to the bus master device 407 (step S523).

Figure 6:
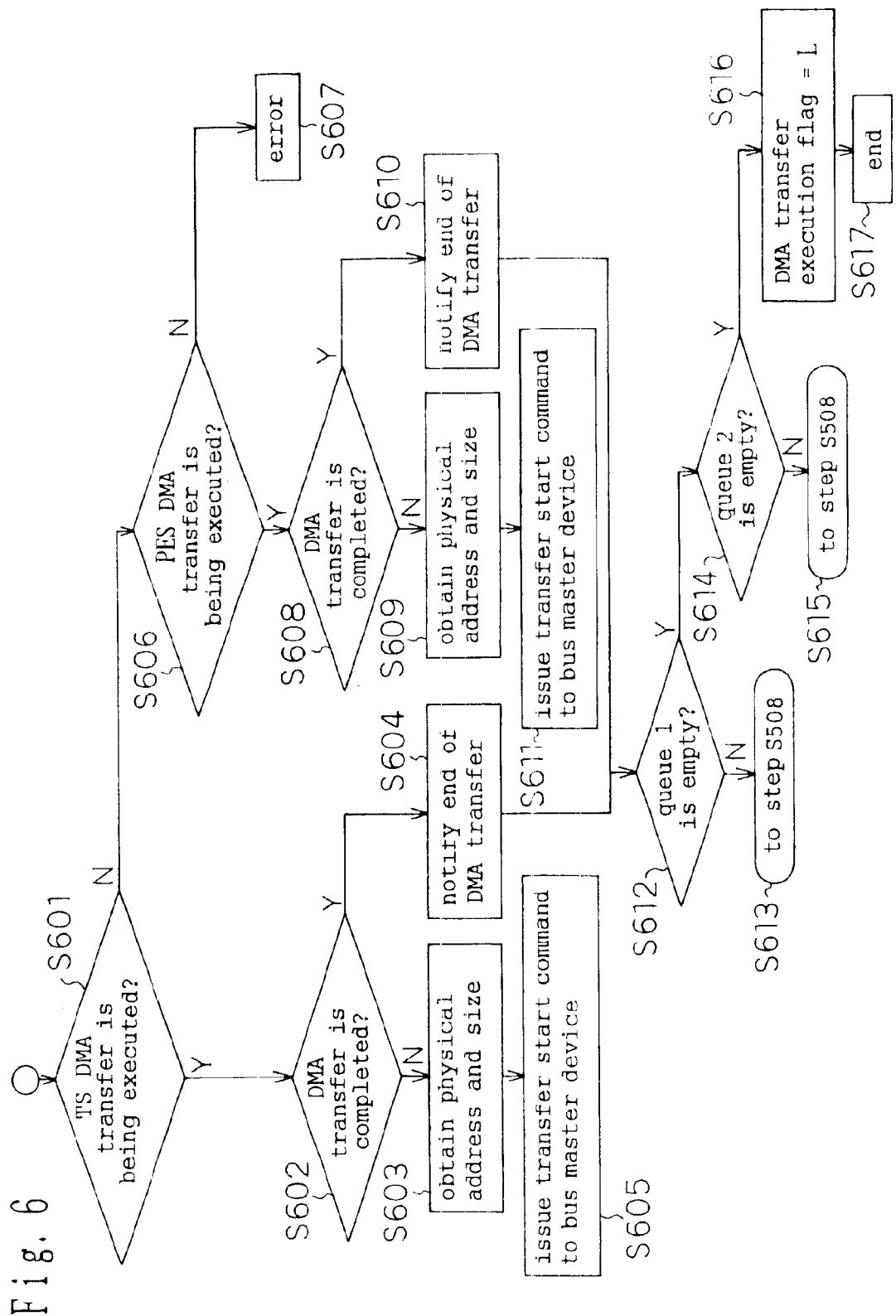
FIG. 6 is an operation flowchart of the device driver 406 in the case where the driver receives an interrupt from a bus master device 407 of FIG. 4.
Figure 7:
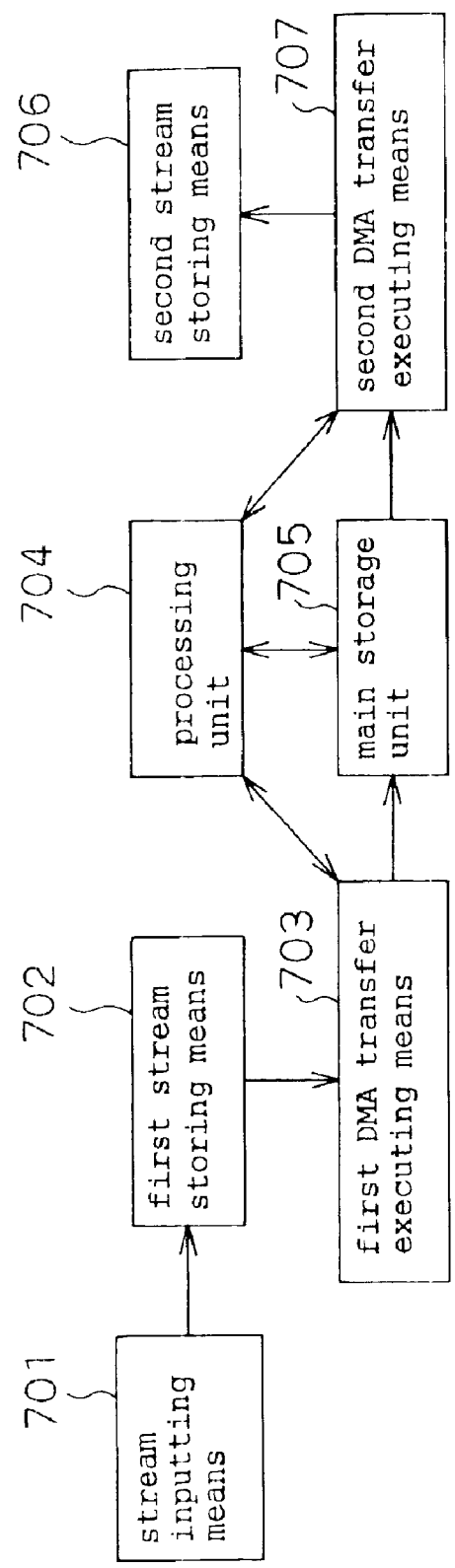
FIG. 7 is a block diagram showing an example of a DMA transfer device of the prior art.

FIG. 6 shows the operation flow of the device driver 406 in the case where the driver receives an interrupt from the bus master device 407. When the device driver 406 receives an interrupt from the bus master device 407, it is judged whether a TS DMA transfer is being executed or not (step S601). If a TS DMA transfer is not being executed, it is judged whether a PES DMA transfer is being executed or not (step S606). If a PES DMA transfer is not being executed, it is judged that an error occurs (step S607).

If a result of the judgement in step S601 shows that a TS DMA transfer is being executed, it is judged whether the DMA transfer of the requested amount of the TS read thread 401 has been completed or not (step S602). If completed, the completion of the DMA transfer is notified to the TS read thread 401 (step S604). If not completed, the scatter-gathered physical address and size which are required for executing the remaining DMA transfer are obtained again, and then notified to the bus master device 407 (step S603). Thereafter, the TS DMA transfer start command is issued to the bus master device 407 (step S605).

If a result of the judgement in step S606 shows that a PES DMA transfer is being executed, it is judged whether the DMA transfer of the requested amount of the PES write thread 403 has been completed or not (step S608). If completed, the completion of the DMA transfer is notified to the PES write thread 403 (step S610) If not completed, the scatter-gathered physical address and size which are required for executing the remaining DMA transfer are again obtained, and then notified to the bus master device 407 (step S609). Thereafter, the PES DMA transfer start command is issued to the bus master device 407 (step S611).

After the end of the DMA transfer is notified (step 5604 or step S610), it is judged whether the queue 1 is empty or not (step S612). If the queue 1 is not empty, the control jumps to step S508 (step S613) to process transfer requests accumulated in the queue 1. If the queue 1 is empty, it is judged whether the queue 2 is empty or not (step S614). If the queue 2 is not empty, the control jumps to step S508 (step S615) to process transfer requests accumulated in the queue 2. If the queue 2 is empty, there is no transfer request to be processed, and hence the DMA transfer execution flag is set to L (step S616). Thereafter, the control is ended (step S617).

When the application and the driver which are to be executed by the CPU 307 are configured and operated as described above, it is possible to implement a DMA transfer which is stable and free from a failure.

In the embodiment, a card for receiving a North American terrestrial digital TV broadcasting has been described. When the tuner 301 and the 8 VSB demodulator 302 are changed to a tuner for a Japanese terrestrial digital TV broadcasting and an OFDM demodulator, it is possible to receive a Japanese terrestrial digital TV broadcasting. When the tuner and the demodulator are changed to a tuner for a Japanese CS digital TV broadcasting and a QPSK demodulator, it is possible to receive a Japanese CS digital TV broadcasting. Namely, the tuner and the demodulator may be changed to those which are suitable for a broadcasting to be received. In place of the tuner 301 and the 8 VSB demodulator 302, an MPEG signal source or a digital-VHS may be used as means for receiving a TS, and a DVD may be used as means for receiving a PS. In the case of a DVD, an application decodes a PS in stead of a TS, to produce a PES.

In the above, the embodiment in which an application produces a PES has been described. Alternatively, an ES may be produced.

A data includes the data structure, the data format, the data kind, and the like. A medium includes a recording medium such as a ROM, a transmission medium such as the Internet, a transmission medium such as light, a radio wave, or a sound wave, and the like. A carrying medium includes a recording medium on which a program and/or a data are recorded, a transmission medium for transmitting a program and/or a data, and the like.

The terms "processable by a computer" means that, in the case a recording medium such as a ROM, for example, the recording medium can be read by a computer, and that, in the case of a transmission medium, a program and/or a data to be transmitted are enabled as a result of transmission to be handled by a computer.

An information aggregation includes, for example, software such as a program and/or a data.

The medium of the invention is a medium on which a program and/or a data for causing a computer to execute a whole or a part of functions of a whole or a part of the means of the device described in any one of the embodiments, and which can be read by a computer so that the program and/or the data that is read cooperates with the computer to execute the functions.

As described above, according to the invention, it is possible to provide a DMA transfer device in which an overflow or an underflow hardly ever occurs.

What is claimed is:

1. A data transfer method by a processor having
   (a) a first data stream transferred from a first memory into a main memory and (b) a second data stream transferred from the main memory into a second memory, comprising the steps of:
   (a) transferring the first data stream into the first memory;
   (b) determining transfer time of step (a) as T1;
   (c) determining time to empty data from the second memory as T2;
   (d) transferring the first data stream from the first memory into the main memory prior to transferring the second data stream from the main memory into the second memory, if T1 is less than T2; and
   (e) transferring the second data stream from the main memory into the second memory prior to transferring the first data stream from the first memory into the main memory, if T2 is less than T1, thereby preventing the second memory from becoming empty.

2. The method of claim 1, further including the steps of:
   requesting a first DMA transfer by the processor prior to the transfer of data in step (d); and
   requesting a second DMA transfer by the processor prior to the transfer of data instep (e).

3. The method of claim 2 further including the step of storing the first and second DMA transfer requests in respective queues.

4. The method of claim 2, wherein step (b) further includes estimating that the transfer the first data stream from the first memory to the main memory is equal to T1.

* * * * *